UNITED STATES PATENT OFFICE.

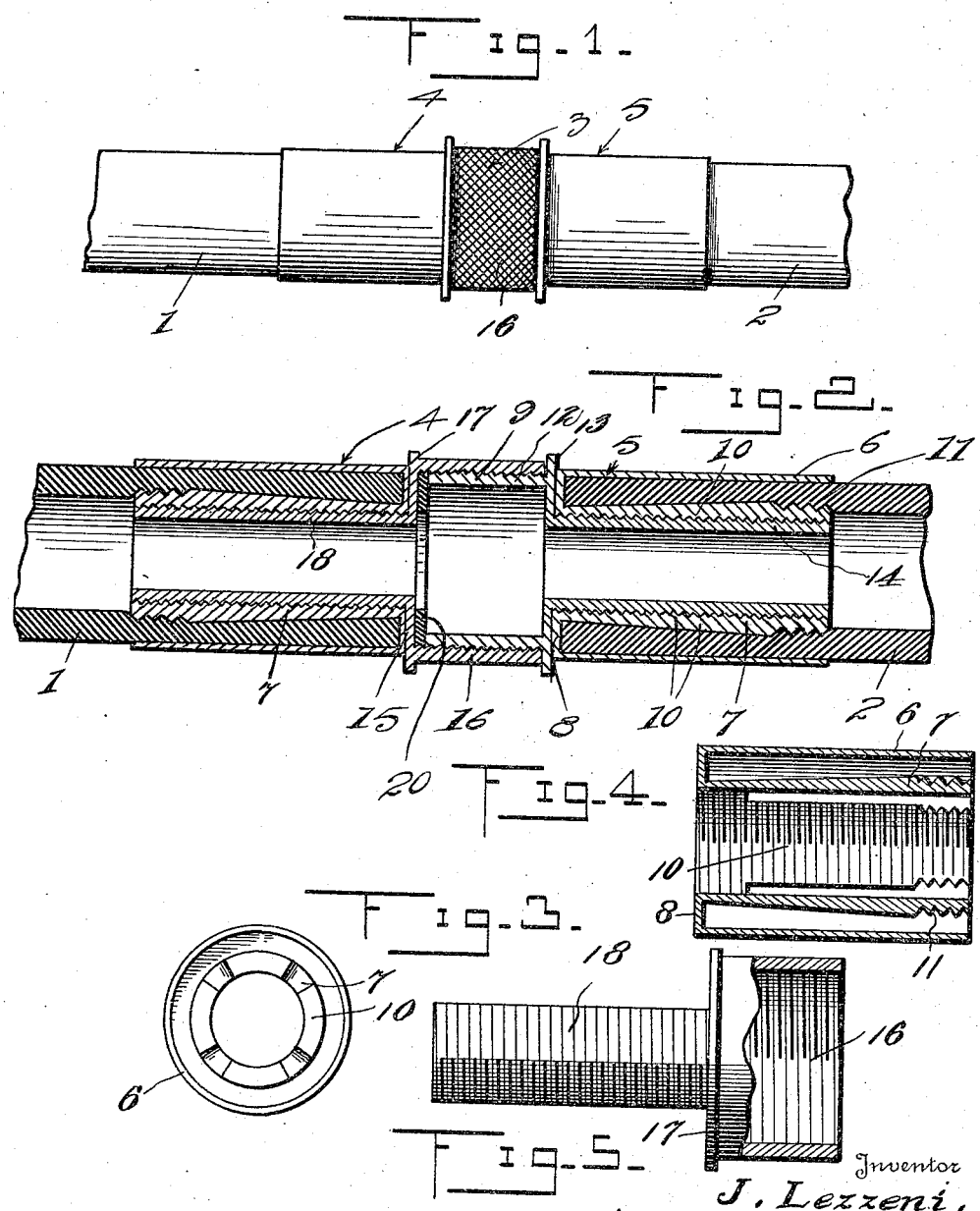

JOHN LEZZENI, OF FAIRFAX, CALIFORNIA.

HOSE-COUPLING.

1,185,215.   Specification of Letters Patent.   Patented May 30, 1916.

Application filed March 17, 1915. Serial No. 14,943.

*To all whom it may concern:*

Be it known that I, JOHN LEZZENI, a citizen of the United States, residing at Fairfax, in the county of Marin and State of California, have invented certain new and useful Improvements in Hose-Couplings; and I do hereby declare the following to be a full, clear, and exact description of the invention, such as will enable others skilled in the art to which it appertains to make and use the same.

This invention relates to hose couplings designed to be applied to all types of hose, tubes, or pipes, and the primary object of the invention is to provide a coupling for two sections of hose, or for connecting the hose to a nozzle or stationary inlet or outlet pipe, or for mending a broken or ruptured section of the hose.

Another object of this invention is to provide a hose coupling embodying a hose end engaging member which includes an external and an internal sleeve, the latter of which is split to form longitudinal branches for engagement with the inner surface of a hose or tubing, and to corrugate the outer surface of a section of the length of the branches for gripping the hose or tubing for preventing accidental displacement of the coupler.

A still further object of this invention is to provide connecting members which are provided with longitudinally extending inserting tubes for insertion into the split internal sleeve, for spreading the branches thereof for forming a secure connection with the ends of a hose or tubing.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved hose coupling, showing two sections of hose connected, Fig. 2 is a longitudinal section through Fig. 1, Fig. 3 is an end view of the hose end engaging member, Fig. 4 is a sectional view through the hose end engaging member, and Fig. 5 is a side elevation partially in section of one of the coupling or connecting members.

Referring more particularly to the drawings, 1 and 2 designate sections of a hose, or other tubular members, which are connected by the improved coupler 3.

The ends of the sections of hose or tubing 1 and 2 have shells 4 and 5 mounted on their facing ends. The shells 4 and 5 comprise outer and inner sleeves 6 and 7, which have their corresponding ends connected by rings or webs 8, which engage the outer ends of the sections 1 and 2 of hose, as clearly shown in Fig. 2 of the drawings. The inner sleeves 7 of the shells 4 and 5 are split to form branches 10, which are internally screw threaded, and have a section of their outer surface, extending inwardly toward the rings or webs 8 exteriorly corrugated, for engagement with the inner surfaces of the hose section, for preventing longitudinal sliding movement of the shell with respect to the hose.

A connecting member 9 is provided, which embodies a sleeve 12, which is exteriorly screw threaded and has a plate 13 formed upon one end thereof and extending transversely to the length of the sleeve 12. An inserting sleeve 14 is formed upon and extends outwardly from the plate 13, upon the opposite side of the plate from the sleeve 12. The sleeve 14 is exteriorly screw threaded and is provided for insertion into the internal sleeve 7 of the shell 5, for securely connecting the coupling members 9 to the section 2 of the hose. The branches 10 of the internal sleeve 7 are constructed of resilient material, so that upon insertion of the sleeve 14 therein, they will be forced outwardly into firm binding engagement with the interior of the section 2 of the hose.

A second coupling member 15 is provided which includes an internally screw threaded sleeve 16, which is provided for receiving the exteriorly screw threaded sleeve 9 therein. A plate 17 is secured to one end of the sleeve 16 and extends transversely therethrough, having an externally screw threaded sleeve 18 formed thereon, and extending from the plate 17 oppositely to the sleeve 16. The sleeve 18 is provided for detachable insertion into the internal sleeve 7 of the shell 4, for spreading the branches 10 outwardly into engagement with the interior of the tube or hose section 1, and for securely and firmly connecting the two sections of hose 1 and 2. If it is so desired, the exterior of the sleeve 16 may be corrugated, for facilitating the rotation of the sleeve.

A gasket 20, constructed of leather, rubber or the like is inserted between the inner surface of the plate 17 and the outer end of the sleeve 9, for forming a fluid-tight connection between the coupling members 9 and 15.

In the application of the improved hose coupler: The shells 4 and 5 are mounted upon the ends of the hose sections which are to be coupled or connected, and the respective coupling members 9 and 15 are connected to the respective shells 4 and 5, by the insertion of the sleeves 14 and 18 into the internal sleeve 7, which insertion spreads the branches 10 of the internal sleeve 7, causing the outer corrugated ends of the sleeve to move into firm binding engagement with the interior of the hose sections, for preventing accidental longitudinal movement of the shells with respect to the hose. After the shell has been properly connected to the coupling sections 9 and 15, the plates 12 and 16 are connected, which forms a secure and firm hose coupling.

In reducing the invention to practice, certain minor features of construction, combination, and arrangement of parts may necessitate alteration to which the patentee is entitled, provided such alterations are comprehended within the scope of what is claimed.

What is claimed is:—

A hose coupling comprising a shell member having spaced walls of substantially the same length adapted to receive the end of a hose therebetween, the inner walls being split longitudinally so as to form flexible fingers, the bore of the inner wall being threaded throughout its length, and a threaded nipple adapted to be inserted into the bore of the inner wall to force the flexible fingers tightly against the hose.

In testimony whereof I affix my signature in presence of two witnesses.

JOHN LEZZENI.

Witnesses:
FRANK J. BURKE,
K. HALL.

Copies of this patent may be obtained for five cents each, by addressing the "Commissioner of Patents Washington, D. C."